(12) United States Patent
Ge et al.

(10) Patent No.: US 12,429,724 B2
(45) Date of Patent: Sep. 30, 2025

(54) ARRAY SUBSTRATE HAVING SPLICING DISPLAY REGION AND VIRTUAL SUB-PIXEL AND METHOD FOR MANUFACTURING SAME, AND LIQUID CRYSTAL PANEL

(71) Applicants: Beijing BOE Optoelectronics Technology Co., Ltd., Beijing (CN); BOE Technology Group Co., Ltd., Beijing (CN); SHANDONG LANBEISITE EDUCATIONAL EQUIPMENT GROUP, Shandong (CN)

(72) Inventors: Yang Ge, Beijing (CN); Yu Zhao, Beijing (CN); Yong Zhang, Beijing (CN); Jian Wang, Beijing (CN); Xian Wang, Beijing (CN); Jianwei Ma, Beijing (CN); Lei Shi, Beijing (CN); XingXing Guan, Beijing (CN); Yashuai An, Beijing (CN); Tianyang Han, Beijing (CN); Xiuliang Wang, Beijing (CN)

(73) Assignees: Beijing BOE Optoelectronics Technology Co., Ltd., Beijing (CN); BOE Technology Group Co., Ltd., Beijing (CN); Shandong Lanbeisite Educational Equipment Group, Shandong (CN)

( * ) Notice: Subject to any disclaimer, the term of this patent is extended or adjusted under 35 U.S.C. 154(b) by 0 days.

(21) Appl. No.: 18/554,971

(22) PCT Filed: Feb. 10, 2023

(86) PCT No.: PCT/CN2023/075467
§ 371 (c)(1),
(2) Date: Oct. 11, 2023

(87) PCT Pub. No.: WO2023/160410
PCT Pub. Date: Aug. 31, 2023

(65) Prior Publication Data
US 2024/0210747 A1 Jun. 27, 2024

(30) Foreign Application Priority Data
Feb. 28, 2022 (CN) .......................... 202210191789.8

(51) Int. Cl.
*G02F 1/1333* (2006.01)
*G02F 1/1337* (2006.01)

(52) U.S. Cl.
CPC .... *G02F 1/13336* (2013.01); *G02F 1/133388* (2021.01); *G02F 1/1337* (2013.01)

(58) Field of Classification Search
CPC ....................... G02F 1/133388; G02F 1/13336
See application file for complete search history.

(56) References Cited

U.S. PATENT DOCUMENTS

| | | |
|---|---|---|
| 2015/0097837 A1 | 4/2015 | Jepsen et al. |
| 2016/0093244 A1 | 3/2016 | Kazmierski et al. |

(Continued)

FOREIGN PATENT DOCUMENTS

| | | |
|---|---|---|
| CN | 101183213 A | 5/2008 |
| CN | 104570611 A | 4/2015 |

(Continued)

*Primary Examiner* — Lauren Nguyen
(74) *Attorney, Agent, or Firm* — IPro, PLLC

(57) ABSTRACT

Provided is an array substrate. The array substrate has a display region and a non-display region disposed on a periphery of the display region. The array substrate includes a substrate and a plurality of patterned film layer structures stacked on the substrate. The plurality of the patterned film layer structures are configured to form a plurality of sub- (Continued)

pixels. The plurality of sub-pixels include a plurality of first sub-pixels within the display region and a plurality of virtual sub-pixels within the non-display region. An area of an orthographic projection of a pixel electrode of the virtual sub-pixel on the substrate is greater than an area of an orthographic projection of a pixel electrode of the first sub-pixel on the substrate.

18 Claims, 11 Drawing Sheets

(56) References Cited

U.S. PATENT DOCUMENTS

| | | | |
|---|---|---|---|
| 2016/0320646 A1* | 11/2016 | Lee | G02F 1/134336 |
| 2018/0331129 A1* | 11/2018 | Gu | H10B 12/31 |
| 2022/0326558 A1 | 10/2022 | Long et al. | |
| 2022/0326599 A1 | 10/2022 | Zou et al. | |

FOREIGN PATENT DOCUMENTS

| | | | | |
|---|---|---|---|---|
| CN | 105044964 A | | 11/2015 | |
| CN | 106537235 A | | 3/2017 | |
| CN | 10-8873504 | * | 11/2018 | ....... G02F 1/133388 |
| CN | 209946604 U | | 1/2020 | |
| CN | 111443566 A | | 7/2020 | |
| CN | 113362726 A | | 9/2021 | |
| JP | 2013156452 A | | 8/2013 | |

\* cited by examiner

ARRAY SUBSTRATE HAVING SPLICING DISPLAY REGION AND VIRTUAL SUB-PIXEL AND METHOD FOR MANUFACTURING SAME, AND LIQUID CRYSTAL PANEL

CROSS-REFERENCE TO RELATED APPLICATION

The present disclosure is a U.S. national stage of international application No. PCT/CN2023/075467, field on Feb. 10, 2023, which claims priority to Chinese Patent Disclosure No. 202210191789.8, filed on Feb. 28, 2022, and entitled "ARRAY SUBSTRATE AND METHOD FOR MANUFACTURING SAME, AND LIQUID CRYSTAL PANEL," the contents of which are herein incorporated by reference in their entireties.

TECHNICAL FIELD

The present disclosure relates to the field of display technologies, and in particular, relates to an array substrate and a method for manufacturing the same, and a liquid crystal panel.

BACKGROUND

For viewing large-sized images, large-sized display panels need to be assembled in display devices.

SUMMARY

Embodiments of the present disclosure provide an array substrate and a method for manufacturing the same, and a liquid crystal panel. The technical solutions are as follows.

According to some embodiments of the present disclosure, an array substrate is provided. The array substrate has a display region and a non-display region disposed on a periphery of the display region. The array substrate includes:
 a substrate and a plurality of patterned film layer structures stacked on the substrate;
 wherein the plurality of the patterned film layer structures are configured to form a plurality of sub-pixels, the plurality of sub-pixels including a plurality of first sub-pixels within the display region and a plurality of virtual sub-pixels within the non-display region;
 wherein an area of an orthographic projection of a pixel electrode of the virtual sub-pixel on the substrate is greater than an area of an orthographic projection of a pixel electrode of the first sub-pixel on the substrate.

In some embodiments, the display region includes a plurality of normal display regions arranged in arrays and a first splicing display region between adjacent two of the normal display regions, wherein a plurality of the first sub-pixels are distributed within the normal display region, and the plurality of sub-pixels further include a plurality of second sub-pixels within the first splicing display region;
 wherein an area of an orthographic projection of a pixel electrode of the second sub-pixel on the substrate is less than or equal to the area of the orthographic projection of the pixel electrode of the first sub-pixel on the substrate.

In some embodiments, the plurality of sub-pixels further include a plurality of third sub-pixels, wherein a portion of each of the third sub-pixels is within the normal display region and another portion of each of the third sub-pixels is within the first splicing display region;
 wherein in a lengthwise direction parallel to the first splicing display region, a width of the portion, within the first splicing display region, of the third sub-pixel is less than or equal to a width of the portion, within the normal display region, of the third sub-pixel.

In some embodiments, the display region further includes a second splicing display region between two first splicing display regions arranged along a row direction and two first splicing display regions arranged along a column direction, and the plurality of sub-pixels further include a fourth sub-pixel within the second splicing display region;
 wherein an area of an orthographic projection of a pixel electrode of the fourth sub-pixel on the substrate is less than or equal to the area of the orthographic projection of the pixel electrode of the second sub-pixel on the substrate.

In some embodiments, the normal display region includes a plurality of alignment regions; wherein
 a film layer structure, closest to the substrate, of the plurality of patterned film layer structures is a first conductive layer, the first conductive layer including a plurality of first alignment structures within the alignment region;
 each of film layer structures, other than the first conductive layer, of the plurality of patterned film layer structures includes one of a plurality of second alignment structures within the alignment region, orthographic projections of the second alignment structures of the film layer structures on the substrate being not overlapped with each other; and
 the plurality of first alignment structures and the plurality of second alignment structures within the same alignment region are in one-to-one correspondence, and a positional relation between an orthographic projection of the first alignment structure on the substrate and an orthographic projection of the corresponding second alignment structure on the substrate satisfies a predetermined positional relation.

In some embodiments, the orthographic projections of the first alignment structures on the substrate are respectively within the orthographic projections of different first sub-pixels on the substrate, and the orthographic projection of the first alignment structure and the orthographic projection of the corresponding second alignment structure on the substrate are within the orthographic projection of a same first sub-pixel on the substrate.

In some embodiments, the first alignment structure includes at least one first strip-shaped structure and at least one second strip-shaped structure, a lengthwise direction of the first strip-shaped structure being intersected with a lengthwise direction of the second strip-shaped structure; and
 the second alignment structure corresponding to the first alignment structure includes at least one third strip-shaped structure and at least one fourth strip-shaped structure; wherein
 a lengthwise direction of the third strip-shaped structure is parallel to the lengthwise direction of the first strip-shaped structure, and a distance between an orthographic projection of the third strip-shaped structure on the substrate and an orthographic projection of the first strip-shaped structure on the substrate is within a first predetermined range; and
 a lengthwise direction of the fourth strip-shaped structure is parallel to the lengthwise direction of the second strip-shaped structure, and a distance between an orthographic projection of the fourth strip-shaped structure on the substrate and an orthographic projection of the second strip-shaped structure on the substrate is within a second predetermined range.

In some embodiments, the number of the first strip-shaped structures and the number of the second strip-shaped structures are both one, and the number of the third strip-shaped structures and the number of the fourth strip-shaped structures in the second alignment structure are both two; wherein the first strip-shaped structure is between the two third strip-shaped structures, and a difference in distances between the orthographic projections of the two third strip-shaped structures on the substrate and the orthographic projection of the first strip-shaped structure on the substrate is less than a first predetermined threshold; and the second strip-shaped structure is between the two fourth strip-shaped structures, and a difference in distances between the orthographic projections of the two fourth strip-shaped structures on the substrate and the orthographic projection of the second strip-shaped structure on the substrate is less than a second predetermined threshold.

In some embodiments, the first alignment structure is an electrode block, the first strip structure and the second strip structure are both strip-shaped grooves within the electrode block, and the orthographic projection of the second alignment structure on the substrate is within the orthographic projection of the corresponding first alignment structure on the substrate.

In some embodiments, the patterned film layer structures, other than the first conductive layer, of the plurality of patterned film layer structures include an active layer pattern, a second conductive layer, a planarization layer, and a pixel electrode layer, wherein the active layer pattern, the second conductive layer, the planarization layer, and the pixel electrode layer are successively stacked along a direction perpendicular to and away from the substrate; and the array substrate further includes a whole-layered gate insulator layer between the active layer pattern and the first conductive layer;

wherein the third strip-shaped structures and the fourth strip-shaped structures in the active layer pattern, the second conductive layer, and the pixel electrode layer are strip-shaped protrusions, and the third strip-shaped structure and the fourth strip-shaped structure in the planarization layer are strip-shaped grooves.

In some embodiments, the first conductive layer further includes a gate electrode of a thin film transistor in the sub-pixel and a gate line electrically connected to the gate electrode;

the active layer pattern further includes an active layer of the thin film transistor in the sub-pixel;

the second conductive layer further includes a first electrode and a second electrode of the thin film transistor in the sub-pixel and a data line electrically connected to the first electrode the planarization layer further includes a connection via; and the pixel electrode layer further includes a pixel electrode in the sub-pixel, the pixel electrode being electrically connected to the second electrode through the connection via.

In some embodiments, the pixel electrode is not provided within the first sub-pixel whose orthographic projection on the substrate is overlapped with the orthographic projection of the second alignment structure in the pixel electrode layer on the substrate; or the pixel electrode within the first sub-pixel whose orthographic projection on the substrate is overlapped with the orthographic projection of the second alignment structure in the pixel electrode layer on the substrate has a hollowed-out structure therein, and the orthographic projection of the second alignment structure in the pixel electrode layer on the substrate and the orthographic projection of the corresponding first alignment structure on the substrate are both within an orthographic projection of the hollowed-out structure on the substrate.

In some embodiments, the first conductive layer further includes an auxiliary signal line, wherein an orthographic projection of the auxiliary signal line on the substrate is at least partially overlapped with the orthographic projection of the pixel electrode in at least a portion of the sub-pixels on the substrate and is not overlapped with the orthographic projection of the first alignment structure on the substrate.

In some embodiments, the auxiliary signal line includes an auxiliary signal line body and a bending coil electrically connected to the auxiliary signal line body, at least a portion of the first alignment structure being within a region enclosed by the bending coil.

In some embodiments, the first conductive layer further includes a plurality of auxiliary alignment structures within the alignment region, wherein the plurality of auxiliary alignment structures are in one-to-one correspondence to the plurality of first alignment structures, and an orthographic projection of the auxiliary alignment structure and the orthographic projection of the corresponding first alignment structure are both within the orthographic projection of a same first sub-pixel on the substrate.

In some embodiments, the plurality of alignment regions in the normal display region are uniformly distributed at edge positions of the normal display region.

According to some embodiments of the present disclosure, a method for manufacturing an array substrate is provided. The array substrate has a display region and a non-display region disposed on a periphery of the display region. The method includes:

successively forming a plurality of stacked patterned film layer structures on a substrate;

wherein the plurality of patterned film layer structures are configured to form a plurality of sub-pixels, the plurality of sub-pixels including a plurality of first sub-pixels within the display region and a plurality of virtual sub-pixels within the non-display region;

wherein area of an orthographic projection of a pixel electrode of the virtual sub-pixel on the substrate is greater than an area of an orthographic projection of a pixel electrode of the first sub-pixel on the substrate.

In some embodiments, the display region includes a plurality of normal display regions arranged in arrays and a first splicing display region between adjacent two normal display regions; and forming each of the patterned film layer structures includes:

forming a whole-layered film layer structure on the substrate;

forming a photoresist film on the film layer structure and successively performing an exposure operation on portions, within the plurality of normal display regions, of the photoresist film by using a mask plate; and forming the patterned film layer structure on the substrate by developing the exposed photoresist film and etching the whole-layered film layer structure;

wherein performing the exposure operation on the portion, within one of the plurality of normal display regions, of the photoresist film includes:

forming a first exposure region within a first normal display region and a target splicing display region by using a first mask of the mask plate, and forming a second exposure region within the non-display region and the target splicing display region by using a second mask of the mask plate; and moving the mask plate along a direction toward the second normal display region until the first mask covers the second normal display region and the second exposure region that is within the target splicing display region and the second mask covers the first exposure region within the target splicing display region;

wherein the first normal display region is any one of the plurality of normal display regions, the second normal display region is a normal display region adjacent to the first normal display region, and the target splicing display region is a first splicing display region between the first normal display region and the second normal display region.

In some embodiments, a unit area of the first exposure region is less than a unit area of the second exposure region.

According to some embodiments of the present disclosure, a liquid crystal panel is provided. The liquid crystal panel includes: an array substrate and a color film substrate that are arranged opposite to each other, and a liquid crystal layer between the array substrate and the color film substrate, wherein the array substrate is the array substrate as described above.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

DETAILED DESCRIPTION

The present disclosure is described in further detail with reference to the accompanying drawings, to clearly present the objects, technical solutions, and advantages of the present disclosure.

In some practices, in preparing a large-sized display panel, a patterned film layer structure in the display panel typically needs to be formed with the aid of a splicing exposure process. For example, during manufacturing of a patterned film layer structure, first, a whole-layered film layer structure is formed on a substrate and coated with a photoresist; thereafter, different partitions of the photoresist are exposed by using the same mask plate; then, the exposed photoresist is developed and the whole-layered film layer structure formed on the substrate is etched; and finally, the photoresist on the substrate is stripped, such that the patterned film layer structure is formed on the substrate.

However, when exposing the photoresist film on the substrate, it is necessary to provide a baffle in a splicing region between two partitions, and after different partitions with the same mask plate are exposed, the splicing region needs to be separately exposed again. As a result, multiple exposures need to be performed to prepare the patterned layer structure in the large-sized display panel. Consequently, the process for manufacturing the large-sized display panel is complex.

Figure 1:
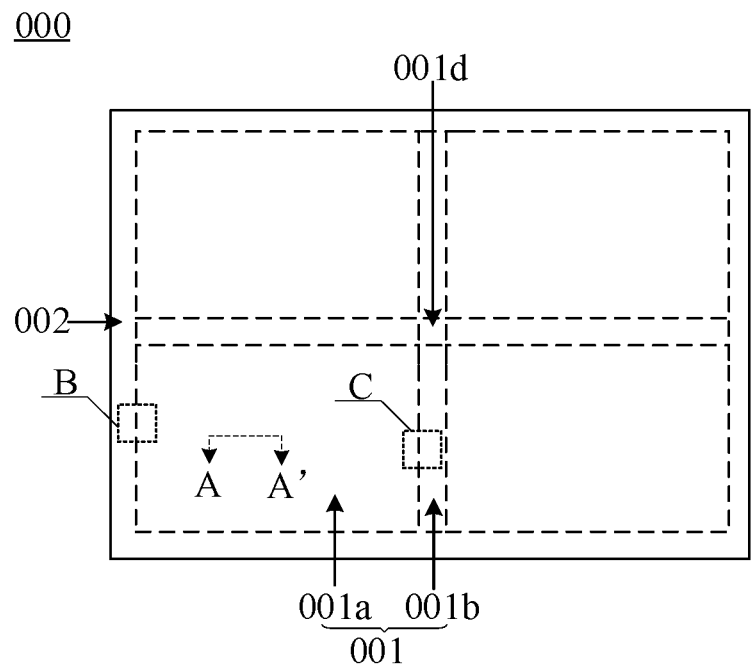
FIG. 1 is a top view of an array substrate according to some embodiments of the present disclosure.
Figure 2:
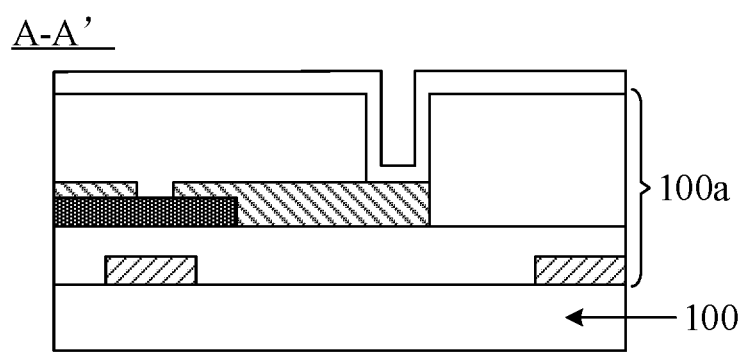
FIG. 2 is a schematic diagram of a film layer structure of the array substrate illustrated in FIG. 1 at a position A-A'.

FIG. 1 is a top view of an array substrate according to some embodiments of the present disclosure. Referring to FIG. 1, the array substrate 000 has a display region 001 and a non-display region 002 disposed on a periphery of the display region 001. For a clearer view of the film layer structure of the array substrate 000, reference is made to FIG. 2, which is a schematic diagram of a film layer structure of the array substrate illustrated in FIG. 1 at a position A-A'. The array substrate 000 includes a substrate 100 and a plurality of patterned film layer structures 100*a* stacked on the substrate 100.

The plurality of patterned film layer structures 100*a* are configured to form a plurality of sub-pixels. For a clearer view of the structures of the plurality of sub-pixels, reference is made to FIG. 3, which is a partially enlarged view of the array substrate illustrated in FIG. 1 at a position B. The plurality of sub-pixels formed by the plurality of patterned film layer structures 100*a* include a first sub-pixel 100*a1* within the display region 001 and a virtual sub-pixel 100*a3* within the non-display region 002. In the present disclosure, an area of an orthographic projection of a pixel electrode of the virtual sub-pixel 100*a3* on the substrate 100 is larger than an area of an orthographic projection of a pixel electrode of the first sub-pixel 100*a1* on the substrate 100.

It should be noted that the area of the orthographic projection of the pixel electrode of the sub-pixel on the substrate in the embodiments of the present disclosure refers to an area enclosed by an outer profile of the orthographic projection of this pixel electrode on the substrate. It should also be noted that the embodiments of the present disclosure give the description using a scenario where the orthographic projection of the pixel electrode of each virtual sub-pixel within the non-display region on the substrate is larger than the area of the orthographic projection of the pixel electrode of the first sub-pixel on the substrate as an example. In other embodiments, the orthographic projection of the pixel electrode of each of a portion of the virtual sub-pixels within the non-display region is larger than the area of the orthographic projection of the pixel electrode of the first sub-pixel on the substrate, while the orthographic projection of the pixel electrode of each of another portion of the virtual sub-pixels on the substrate is equal to the area of the orthographic projection of the pixel electrode of the first sub-pixel on the substrate, which is not limited herein.

In some embodiments, as illustrated in FIG. 1, the display region 001 includes a plurality of normal display regions 001a arranged in arrays and a first splicing display region 001b between adjacent two normal display regions 001a. The plurality of normal display regions 001a within the display region 001 herein are arranged in at least one row and/or at least one column. FIG. 1 gives the description using a scenario where the plurality of normal display regions 001a within the display region 001 are arranged in two rows and two columns as an example.

Figure 3:
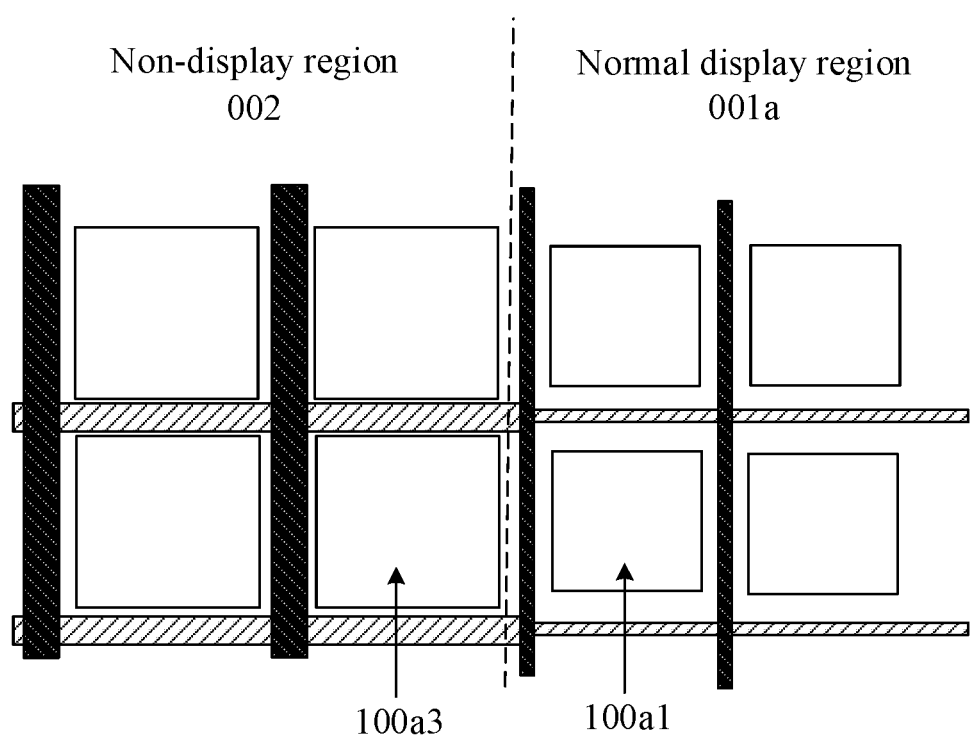
FIG. 3 is a partially enlarged view of the array substrate illustrated in FIG. 1 at a position B.
Figure 4:
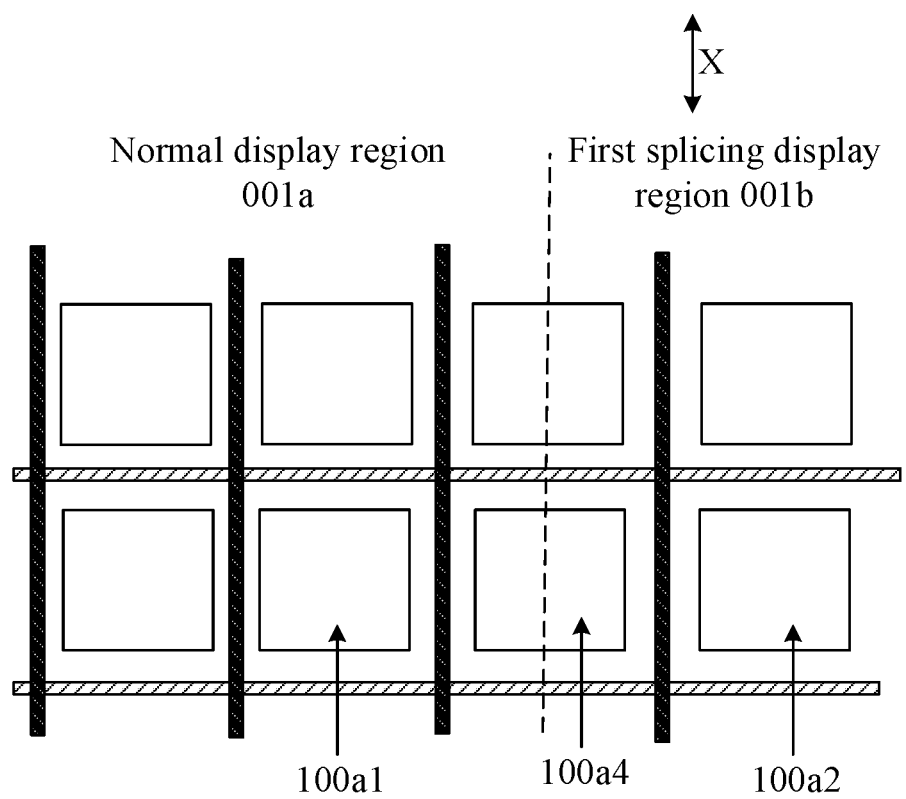
FIG. 4 is a partially enlarged view of the array substrate illustrated in FIG. 1 at a position C.

FIG. 4 is a partially enlarged view of the array substrate illustrated in FIG. 1 at a position C. As illustrated in FIG. 3 and FIG. 4, the plurality of sub-pixels formed by the plurality of patterned film layer structures 100a further include a plurality of second sub-pixels 100a2 within the first splicing display region 001b. The area of the orthographic projection of the pixel electrode of the virtual sub-pixel 100a3 on the substrate 100 is also larger than an area of an orthographic projection of a pixel electrode of the second sub-pixel 100a2 on the substrate 100.

In some embodiments, in each of the patterned film layer structures 100a in the array substrate 000, a portion within the normal display region 001a is formed based on a first mask of a mask plate, a portion within the non-display region 002 is formed based on a second mask of the mask plate, and a portion within the first splicing display region 001b is formed based on the first mask and the second mask. The first mask and the second mask herein are masks within different regions of the same mask plate.

It should be noted that each of the patterned film layer structures 100a in the array substrate 000 is formed based on a mask of the mask plate. Exemplarily, in the case that a patterned film layer structure in the array substrate 000 needs to be formed, first, a whole-layered film layer structure is formed on the substrate 100 and is coated with a photoresist film; thereafter, an exposure operation is performed on portions, within the plurality of normal display regions 001a, of the photoresist film by using the same mask plate; and then, a development process is performed on the exposed photoresist film, and an etching process is performed on the whole-layered film layer structure; finally, the photoresist on the substrate is stripped. In this way, the patterned film layer structure is formed on the substrate 100.

The exposure operation performed on a portion, within one of the normal display regions, of the photoresist film includes: forming a first exposure region within a first normal display region and a target splicing display region by using the first mask of the mask plate, and forming a second exposure region within the non-display region and the target splicing display region by using the second mask of the mask plate; and moving the mask plate along a direction toward the second normal display region until the first mask covers the second normal display region and the second exposure region that is within the target splicing display region and the second mask covers the first exposure region within the target splicing display region. The first normal display region is any one of the plurality of normal display regions 001a, the second normal display region is a normal display region adjacent to the first normal display region, and the target splicing display region is a first splicing display region between the first normal display region and the second normal display region.

It should be noted that after the photoresist film is exposed by using the mask of the mask plate, the exposure region is formed in the photoresist film. Subsequently, after the exposed photoresist film is developed, the photoresist, outside the exposure region, of the photoresist film is removed, while the photoresist within the exposure region is retained, and thus the photoresist pattern is acquired. Therefore, in the patterned film layer structure 100a in the array substrate 000 formed based on the same mask plate, a portion within the normal display region 001a is formed based on the first mask of this mask plate, a portion within the non-display region 002 is formed based on the second mask of this mask plate, and a portion within the first splicing display region 001b is formed based on the first mask and the second mask of this mask plate.

It should be noted that the first mask and the second mask of the mask plate have similar shapes, but a unit area of the second exposure region formed by exposing the photoresist film using the second mask of the mask plate is larger than a unit area of the first exposure region formed by exposing the photoresist film using the first mask of the mask plate. Thus, in the patterned film layer structure 100a in the array substrate 000 formed based on the same mask plate, a unit area of a portion, within the non-display region 002, of the pattern is larger than a unit area of a portion, within the normal display region 001a, of the pattern. In this way, the area of the orthographic projection of the pixel electrode of the virtual sub-pixel 100a3 within the non-display region 002 on the substrate 100 is larger than the area of the orthographic projection of the pixel electrode of the first sub-pixel 100a1 within the normal display region 001a on the substrate 100. It should be noted that the unit area of the pattern herein refers to the area of this pattern within the same region, for example, this region is a sub-pixel region in the array substrate 000.

Figure 5:
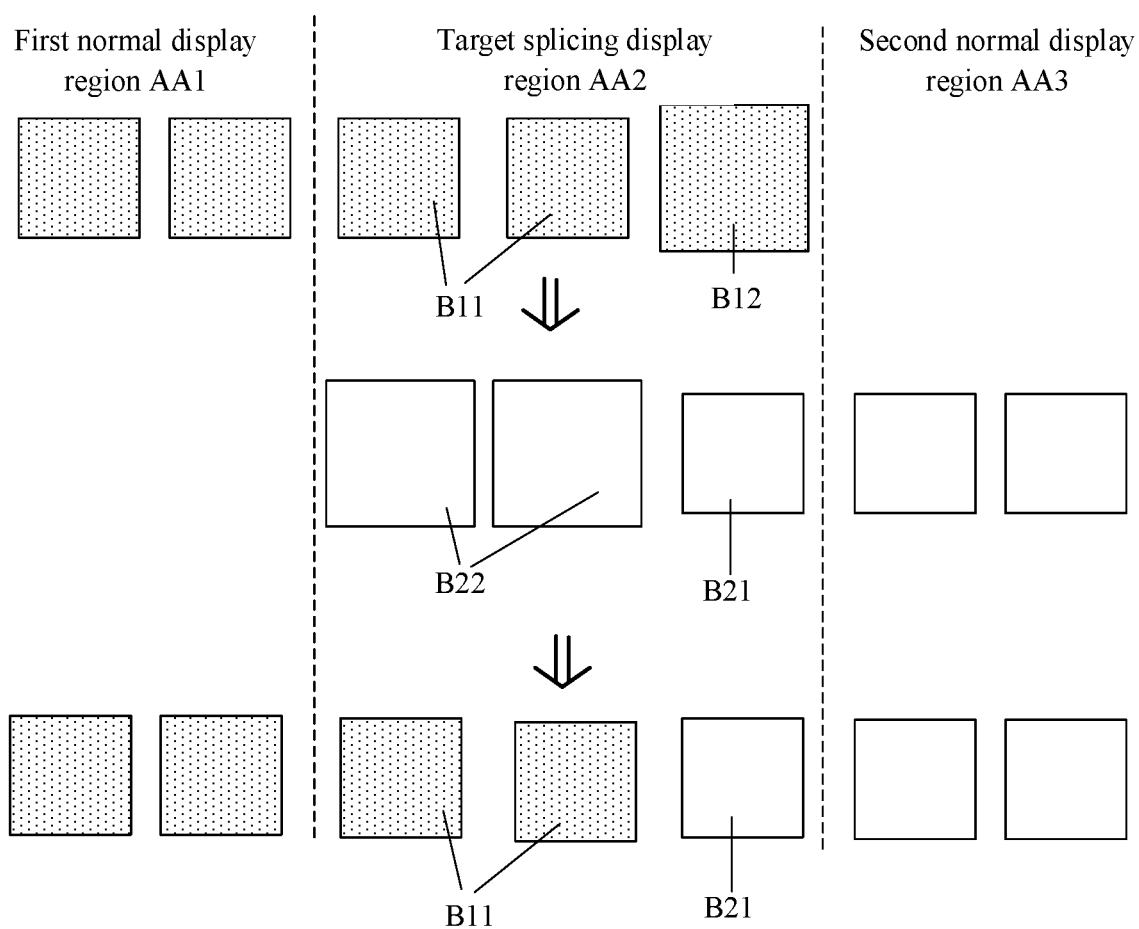
FIG. 5 is a schematic diagram of performing two exposures on a target splicing display region according to some embodiments of the present disclosure.

In some embodiments, a portion, within the first splicing display region, of the photoresist film is exposed twice. FIG. 5 is a schematic diagram of performing two exposures on a target splicing display region according to some embodiments of the present disclosure. For example, as illustrated in FIG. 5, in the process of exposing a portion, within the first normal display region AA1, of the photoresist film by using the first mask of the mask plate, a first exposure is performed on a portion, within the target splicing display region AA2, of the photoresist by using the first mask and the second mask of this mask plate, such that a first exposure region B11 and a second exposure region B12 are formed in the portion, within the target splicing display region AA2, of the photoresist film. In the process of exposing a portion, within the second normal display region AA3, of the photoresist film by using the first mask of the mask plate, a second exposure is performed on the portion, within the target splicing display region AA2, of the photoresist film by using the first mask and the second mask of this mask plate, such that a first exposure region B21 and a second exposure region B22 are formed in the portion, within the target splicing display region AA2, of the photoresist film.

In the portion, within the target splicing display region AA2, of the photoresist film, a center point of the first exposure region B11 formed during the first exposure is coincident with a center point of the second exposure region B22 formed during the second exposure, and a center point of the second exposure region B12 formed during the first exposure is coincident with a center point of the first exposure region B21 formed during the second exposure. Further, a unit area of the first exposure region is less than a unit area of the second exposure region. Therefore, after the portion, within the target splicing display region AA2, of the photoresist film is exposed twice and the photoresist film is developed, only the photoresist within the first exposure region having a less unit area is retained. That is, only the photoresist, within the first exposure region B11 formed during the first exposure and the first exposure region B21 formed during the second exposure, is retained. It should be noted that in FIG. 5, the pattern of dotted fillers represents the exposure region formed during the first exposure, and the white pattern represents the exposure region formed during the second exposure. In FIG. 5, exposure regions in a first row are exposure regions formed when only the first exposure is considered, exposure regions in a second row are exposure regions formed when only the second exposure is considered, and exposure regions in a third row are exposure regions formed when the first exposure and the second exposure are both considered.

In this way, in the patterned film layer structure 100a in the array substrate 000 formed based on the same mask plate, a unit area of a portion, within the first splicing display region 001b, of the pattern is less than a unit area of a portion, within the non-display region 002, of the pattern. Therefore, the area of the orthographic projection of the pixel electrode of the second sub-pixel 100a2 within the first splicing display region 001b on the substrate 100 is smaller than the area of the orthographic projection of the pixel electrode of the virtual sub-pixel 100a3 within the non-displayed region 002 on the substrate 100.

In the related art, in the case that the film layer structure within the first splicing display region is formed by two exposures, the same mask of the mask plate is used for exposure in the two exposures, and thus the unit area of the film layer structure finally formed in the first splicing display region is small, which is less than the unit area of the film layer structure formed in the normal display region. As a consequence, the uniformity of the same patterned film layer structure in the array substrate is poor, and thus the display effect of the subsequently formed display panel is poor.

In the embodiments of the present disclosure, in the process of forming the film layer structure within the first splicing display region 001b, two exposures need to be performed. The first mask and the second mask in the mask plate are used simultaneously in the two exposures, and after the two exposures and the development of the photoresist film, only the photoresist within the first exposure region formed based on the first mask is retained. At the same time, in the process of forming the film layer structure within the normal display region 001a, the exposure is required to be performed once, and after this exposure and the development of the photoresist film, only the photoresist within the first exposure region formed based on the first mask is retained. Accordingly, in the patterned film layer structure 100a in the array substrate 000 formed based on the same mask plate, the unit area of the portion, within the first splicing display region 001b, of the pattern is approximately equal to the unit area of the portion, within the normal display region 001a, of the pattern In this way, the uniformity of the patterned film layer structures 100a within the array substrate 000 in the embodiments of the present disclosure is good, and thus the display effect of the display panel subsequently formed based on this array substrate 000 is good.

In summary, the array substrate according to some embodiments of the present disclosure includes the substrate and the plurality of patterned film layer structures stacked on the substrate. The portion, within the first splicing display region, of the patterned film layer structure is formed based on the first mask and the second mask of the mask plate, the portion, within the normal display region, of the patterned film layer structure is formed based on the first mask of this mask plate, and the portion, within the non-display region, of the patterned film layer structure is formed based on the second mask of this mask plate. Therefore, in the process of forming the patterned film layer structure in the array substrate, there is no need to separately expose the photoresist within the first splicing display region using an additional mask plate, such that the number of exposures is effectively reduced, and thus the manufacturing process for a large-sized display panel subsequently prepared based on this array substrate is simplified. Moreover, in the process of forming the film mask and the second mask of the mask plate are simultaneously used in the two exposures, and after the two exposures and the development of the photoresist film, only the photoresist within the first exposure region formed based on the first mask is retained. Accordingly, in the patterned film layer structure in the array substrate formed based on the same mask plate, the unit area of the portion, within the first splicing display region, of the pattern is approximately equal to the unit area of the portion, within the normal display region, of the pattern. In this way, the uniformity of the patterned film layer structures within the array substrate in the embodiments of the present disclosure is good, and thus the display effect of the display panel subsequently formed based on this array substrate is good.

In some embodiments, in the process of exposing the same region in the photoresist film twice, there is typically some exposure error. As a result, in the patterned film layer structure 100a in the array substrate 000 formed based on the same mask plate, the unit area of the portion, within the first splicing display region 001b, of the pattern is slightly less than the unit area of the portion, within the normal display region 001a, of the pattern. For example, in the case that this patterned film layer structure 100a includes a signal line, a width of the signal line within the first splicing display region 001b is less than a width of the signal line within the normal display region 001a by 0.1 to 2 microns. In this way, the area of the orthographic projection of the pixel electrode of the second sub-pixel 100a2 within the first splicing display region 001b on the substrate 100 is less than or equal to the area of the orthographic projection of the pixel electrode of the first sub-pixel 100a1 within the normal display region 001a on the substrate 100.

In some embodiments, as illustrated in FIG. 1, the display region 001 of the array substrate 000 further includes a second splicing display region 001d between two first splicing display regions 001b arranged along a row direction and two first splicing display regions 001b arranged along a column direction. The plurality of sub-pixels formed by the plurality of patterned film layer structures 100a further include a plurality of fourth sub-pixels within the second splicing display region 001d. In some embodiments, four exposures are required to perform on the second splicing display region 001d during the process of preparing the patterned film layer structure 100a in the array substrate 000, and therefore, in the patterned film layer structure 100a formed based on the same mask plate in the array substrate 000, the unit area of the portion, within the second splicing display region 001d, of the pattern is slightly less than the unit area of the portion, within the first splicing display region 001b, of the pattern. In this way, an area of an orthographic projection of a pixel electrode of the fourth sub-pixel within the second splicing display region 001d on the substrate 100 is less than or equal to the area of the orthographic projection of the pixel electrode of the second sub-pixel 100a2 within the first splicing display region 001b on the substrate 100.

In some embodiments, the plurality of sub-pixels formed by the plurality of patterned film layer structures 100a further include, as illustrated in FIG. 4, a plurality of third sub-pixels 100a4. A portion of the third sub-pixel 100a4 is within the normal display region 001a, and the other portion is within the first splicing display region 00a2. In this case, a boundary line between the first splicing display region 001b and the normal display region 001a in the array substrate 000 is within a region where the third sub-pixel 100a4 is disposed. An area of a pattern in the region where the third sub-pixel 100al is disposed is larger than an area of a pattern in a region between adjacent two columns of sub-pixels. For example, the pattern in the region where the third sub-pixel 100al is disposed includes pixel electrodes, and the pattern in the region between the adjacent two columns of sub-pixels includes data lines. Therefore, in the case that the boundary line between the first splicing display region 001b and the normal display region 001a is within the region where the third sub-pixel 100a4 is disposed, the patterned film layer structures within the first splicing display region 001b are arranged more uniformly. For example, line widths of the data lines within the first splicing display region 001b are ensured to be all equal.

Exemplarily, in a lengthwise direction parallel to the first splicing display region 100al, i.e., an X direction in FIG. 4, a width of a portion, within the first splicing display region 001b, of the third sub-pixel 100a4 is less than or equal to a width of a portion, within the normal display region 001, of the third sub-pixel 100a4. It should be noted that in the lengthwise direction parallel to the first splicing display region 100al, the width of the portion, within the first splicing display region 001b, of the third sub-pixel 100a4 is equal to the width of the portion, within the normal display region 001a, of the third sub-pixel 100a4. However, in some embodiments, the width of the portion, within the first splicing display region 001b, of the third sub-pixel 100a4 is slightly less than the width of the portion, within the normal display region 001a, of the third sub-pixel 100a4, due to the exposure error in the process of performing two exposures.

To prepare the array substrate in the above embodiments that simultaneously includes the first sub-pixel, the second sub-pixel, the third sub-pixel, and the virtual sub-pixel, it is necessary to shield a portion of the second mask of the mask plate by a shielding plate in the process of exposing the photoresist film using the mask plate, which is described in detail with reference to the following embodiments.

Figure 6:
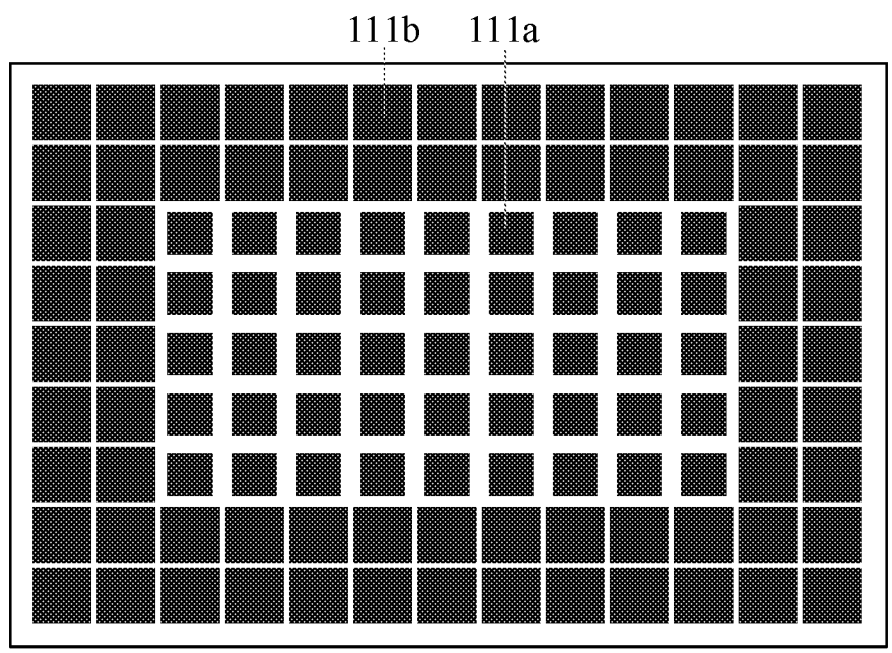
FIG. 6 is a schematic structural diagram of a mask plate according to some embodiments of the present disclosure.

FIG. 6 is a schematic structural diagram of a mask plate according to some embodiments of the present disclosure. Referring to FIG. 6, the mask plate 111 includes a first mask 111a and a second mask 111b distributed around the first mask 111a. In the process of forming the patterned film layer structure 100a in the array substrate 000, after a whole-layered photoresist film is formed on the substrate, the first mask 111a of the mask plate 111 is configured to expose a portion, within the normal display region 001a and the first splicing display region 001b, of the photoresist film, and the second mask 111b of the mask plate 111 is configured to expose a portion, within the first splicing display region 001b and the non-display region 002, of the photoresist film.

Figure 7:
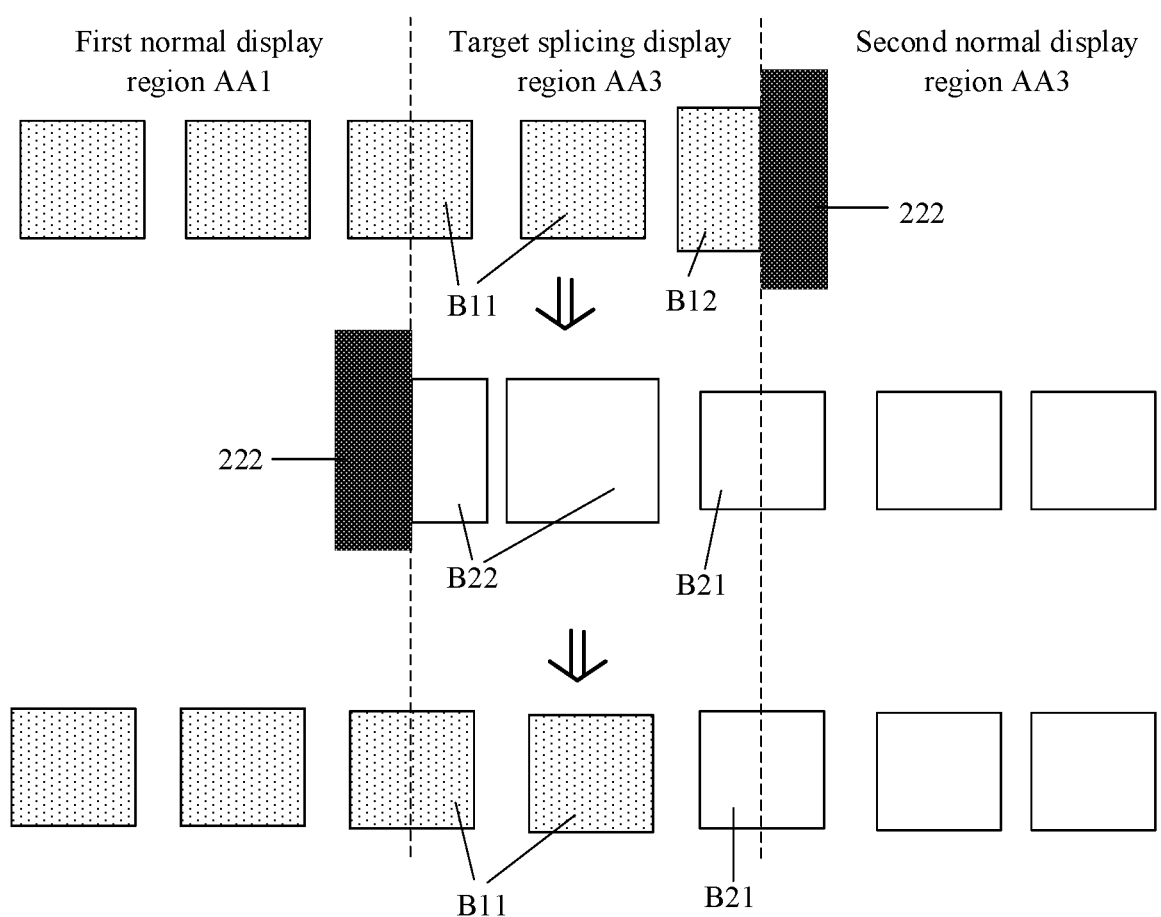
FIG. 7 is another schematic diagram of performing two exposures on a target splicing display region according to some embodiments of the present disclosure.

FIG. 7 is another schematic diagram of performing two exposures on a target splicing display region according to some embodiments of the present disclosure. Referring to FIG. 7, to form the third sub-pixel 100a4 in the array substrate, it is necessary to shield a portion, proximal to the second normal display region AA3, of the second mask 111b of the mask plate 111 using the shielding plate 222 during the process of exposing the portion, within the first normal display region AA1, of the photoresist film by the first mask 111a of the mask plate 111. Moreover, it is necessary to shield a portion, proximal to the first normal display region AA1, of the second mask 111b of the mask plate 111 using the shielding plate 222 during the process of exposing the portion, within the second normal display region AA3, of the photoresist film by the first mask 111a of the mask plate 111.

It is assumed that a film layer structure within two rows of sub-pixels is formed based on the second mask 111b of the mask plate 111. It is further assumed that while the first mask 111a of the mask plate 111 exposes the portion, within the first normal display region AA1, of the photoresist film, the exposure performed on the target splicing display region AA2 is a first exposure; and while the first mask 111a of the mask plate 111 exposes the portion, within the second normal display region AA3, of the photoresist film, the exposure performed on the target splicing display region AA2 is a second exposure.

Accordingly, during the process of performing the first exposure on the target splicing display region AA2, a portion, used to form a row of sub-pixels and a half, of the first mask 111a of the mask plate 111 needs to be used to expose the target splicing display region AA2, such that the first exposure region B11 is formed within the target splicing display region AA2, and the shielding plate 222 needs to be used to shield the portion, used to form a row of sub-pixels and a half, of the second mask 111b of the mask plate 111, such that an un-shielding portion of the second mask 111b exposes the target splicing display region AA2, and thus the second exposure region B12 is formed within the target splicing display region AA2. A row of sub-pixels and a half are subsequently formed based on the first exposure region B11, and a half row of sub-pixels is subsequently formed based on the second exposure region B12.

During the process of performing the second exposure on the target splicing display region AA2, a portion, used to form a half row of sub-pixels, of the first mask 111a of the mask plate 111 needs to be used to expose the target splicing display region AA2, such that the first exposure region B21 is formed within the target splicing display region AA2, and the shielding plate 222 needs to be used to shield a portion, used to form a half row of sub-pixels, of the second mask 111b of the mask plate 111, such that the unmasked portion of the second mask 111b exposes the target splicing display region AA2, and thus the second exposure region B22 is formed within the target splicing display region AA2. In the case that the effect of the first exposure is disregarded, a half row of sub-pixels is formed subsequently based on the first exposure region B21, and a row of sub-pixels and a half are formed subsequently based on the second exposure region B22.

In this case, in simultaneously considering the effects of two exposures, after the first exposure forms the first exposure region B11, a region where this first exposure region B11 is disposed is the same as a region where the second exposure region B22 formed by the subsequent second exposure is disposed, and an area of this first exposure region B11 is smaller than an area of the second exposure region B22, and therefore, the second exposure area B22 formed by the second exposure does not affect the area of the first exposure region B11 formed by the first exposure. Similarly, after the first exposure forms the second exposure region B12, a region where the second exposure region B12 is disposed is the same as a region where the first exposure region B21 formed by the subsequent second exposure is disposed, and an area of the second exposure region B12 is larger than an area of the first exposure region B21, and therefore, after the second exposure is performed on the second exposure region B12 formed by the first exposure, the first exposure region B21 is acquired. In this way, it can be ensured that after two exposures are performed on the portion, within the target splicing display region AA2, of the photoresist film and the development of the photoresist film, only the photoresist within the first exposure region B11 formed during the first exposure and the first exposure region B21 formed during the second exposure is retained.

Thus, in the process of forming the patterned film layer structure within the array substrate 000, in the case that the photoresist film is exposed in the manner described above, the third sub-pixel 100a4 is subsequently formed within the array substrate 000.

It should be noted that the first normal display region AA1 and the second normal display region AA3 illustrated in the above embodiments give the schematic description using a scenario where two normal display regions are arranged in a left-right direction as an example. The exposure of two normal display regions arranged in a top-bottom direction and the first splicing display region therebetween is the same as that of tow normal display regions arranged in a left-right direction and the first splicing display region therebetween, which is not repeated herein.

Figure 8:
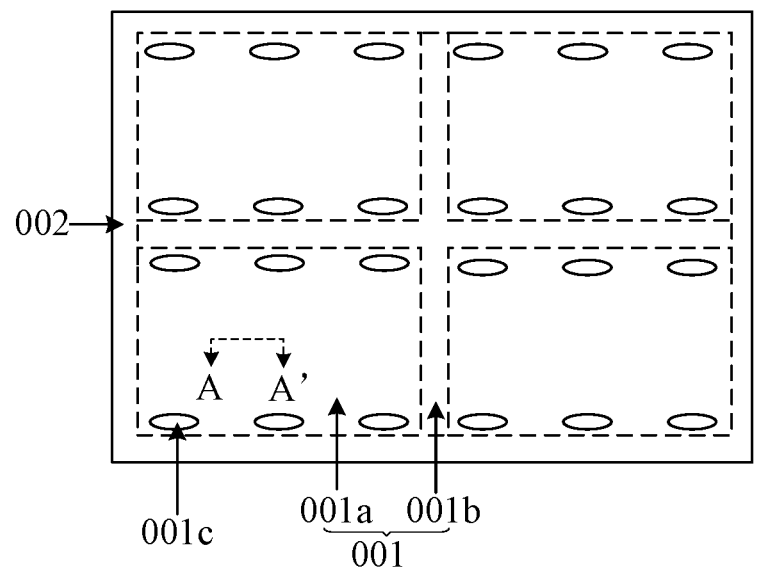
FIG. 8 is a top view of another array substrate according to some embodiments of the present disclosure.
Figure 9:
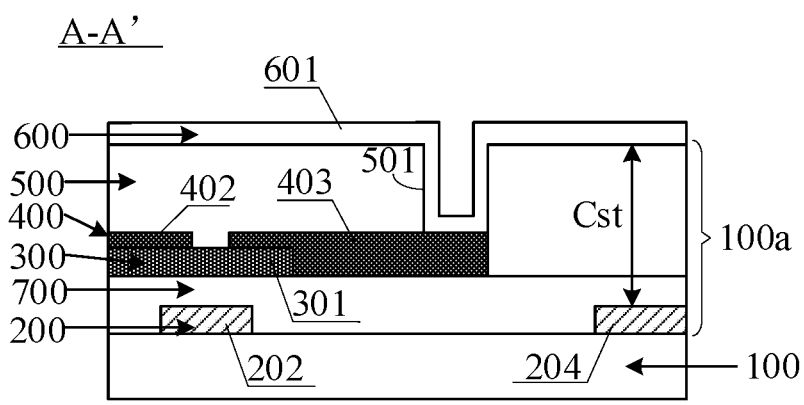
FIG. 9 is a schematic diagram of a film layer structure of the array substrate illustrated in FIG. 8 at a position A-A'.

FIG. 8 is a top view of another array substrate according to some embodiments of the present disclosure. FIG. 9 is a schematic diagram of a film layer structure of the array substrate illustrated in FIG. 8 at a position A-A'.

In some embodiments, referring to FIG. 8, and FIG. 9, a film layer structure, closet to the substrate 100, of the plurality of patterned film layer structures 100a in the array substrate 000 is a first conductive layer 200. The first conductive layer 200 includes a plurality of first alignment structures 201 within each of alignment regions 001c (not indicated in FIG. 8 and FIG. 9 and subsequently indicated in FIG. 10). Orthographic projections of the respective first alignment structures 201 on the substrate 100 are not overlapped with each other.

Each of film layer structures, other than the first conductive layer 200, of the plurality of patterned film layer structures 100a in the array substrate 000 includes one of a plurality of second alignment structures (not indicated in FIG. 8 and FIG. 9) within the alignment region. Orthographic projections of the second alignment structures of the patterned film layer structures 100a on the substrate 100 is not overlapped with each other.

In the present disclosure, a region, where the first alignment structure 201 and the second alignment structure are arranged, of the normal display region 001a of the array substrate 000 is referred to as the alignment region 001c. Within the same alignment region 001c, a plurality of first alignment structures 201 and a plurality of second alignment structures are provided, and the plurality of first alignment structures 201 are in one-to-one correspondence to the plurality of second alignment structures. It should be noted that each of the patterned film layer structures 100a within the same alignment region 001c has one second alignment structure, and therefore, both the number of first alignment structures 201 and the number of second alignment structures within the same alignment region 001c are the same as the number of layers of the film layer structures, other than the first conductive layer 200, of the plurality of patterned film layer structures 100a.

For example, as illustrated in FIG. 9, the number of layers of the film layer structures, other than the first conductive layer 200, of the plurality of patterned film layer structures 100a is four, namely: an active layer pattern 300, a second conductive layer 400, a planarization layer 500, and a pixel electrode layer 600. The active layer pattern 300, the second conductive layer 400, the planarization layer 500, and the pixel electrode layer 600 are successively stacked along a direction perpendicular to and away from the substrate 100. Accordingly, the number of first alignment structures 201 and the number of second alignment structures within the same alignment region 001c are both four. It should be noted that the array substrate 000 includes, in addition to the plurality of patterned film layer structures 100a, a whole-layered film layer structure. For example, the array substrate 000 further includes a whole-layered gate insulator layer 700 between the active layer pattern 300 and the first conductive layer 200. The patterned film layer structure in the array substrate 000 herein refers to a film layer structure that needs to be formed based on a mask plate and by a patterning process, and the whole-layered film layer structure in the array substrate 000 herein refers to a film layer structure that does not need to be formed by a patterning process.

In the present disclosure, a positional relation between an orthographic projection of the first alignment structure 201 on the substrate 100 and an orthographic projection of the corresponding second alignment structure on the substrate 100 satisfies a predetermined positional relation. Satisfying the predetermined positional relation herein means that a distance between the orthographic projection of the first alignment structure 201 on the substrate 100 and the orthographic projection of the corresponding second alignment structure on the substrate 100 is within a predetermined range, and the first alignment structure 201 and the corresponding second alignment structure are distributed in parallel.

In some embodiments, to ensure a good display effect of the display panel subsequently formed based on the array substrate 000, it is necessary to ensure that positions of the stacked patterned film layer structures 100a are not offset during the process of forming the plurality of stacked patterned film layer structures 100a. To this end, the first alignment structure 201 and the second alignment structure are designed, and the positional relation between the orthographic projection of each of the first alignment structures 201 on the substrate 100 and the orthographic projection of the corresponding second alignment structure on the substrate 100 is caused to satisfy the predetermined positional relation, such that none of the patterned film layer structures 100a is offset with respect to the first conductive layer 200.

Exemplarily, in the process of preparing the array substrate 000, after the first conductive layer 200 including the plurality of first alignment structures on the substrate 100 is formed, it is necessary to form other patterned film layer structures on the first conductive layer. In the process of forming other patterned film layer structures, after the photoresist film is exposed by the exposure method described above and the exposed photoresist film is developed, a photoresist pattern having the same shape as this patterned film layer structure is acquired. Thus, this photoresist pattern includes a photoresist alignment structure having the same shape as the second alignment structure in the patterned film layer structure. Subsequently, after it is determined that a positional relation between an orthographic projection of the photoresist alignment structure on the substrate 100 and an orthographic projection of the corresponding first alignment structure 201 on the substrate 201 satisfies a predetermined relation, the subsequent etching process is performed, otherwise, it is necessary to strip the photoresist pattern and perform the process of photoresist coating, exposure, and development again. In this case, after the patterned film layer structure is acquired by subsequently performing the etching process, the positional relation between the orthographic projection of the second alignment structure of this patterned film layer structure on the substrate 100 and the orthographic projection of the corresponding first alignment structure 201 on the substrate 201 satisfies the predetermined relation.

Optionally, the first conductive layer 200 in the array substrate 000 typically further includes a signal line electrically connected to the sub-pixel, and the signal line is typically disposed on a periphery of the region where the sub-pixel is disposed. Therefore, to allow the first alignment structure 201 not to affect the positional distribution of the signal line, both the first alignment structure 201 and the corresponding second alignment structure are arranged within the region where the sub-pixel is disposed. That is, the orthographic projections of the first alignment structure 201 and the corresponding second alignment structure on the substrate 100 are within the orthographic projection of the same first sub-pixel 100a*l* on the substrate 100. To facilitate subsequent determination of the positional relation between the second alignment structures and the corresponding first alignment structures in different patterned film layer structures, each of the first alignment structures 201 and the corresponding second alignment structure are disposed in each of regions where different sub-pixels are disposed. That is, the orthographic projections of the first alignment structures 201 on the substrate 100 are respectively within the orthographic projections of different first sub-pixels 100a*l* on the substrate 100.

Figure 10:
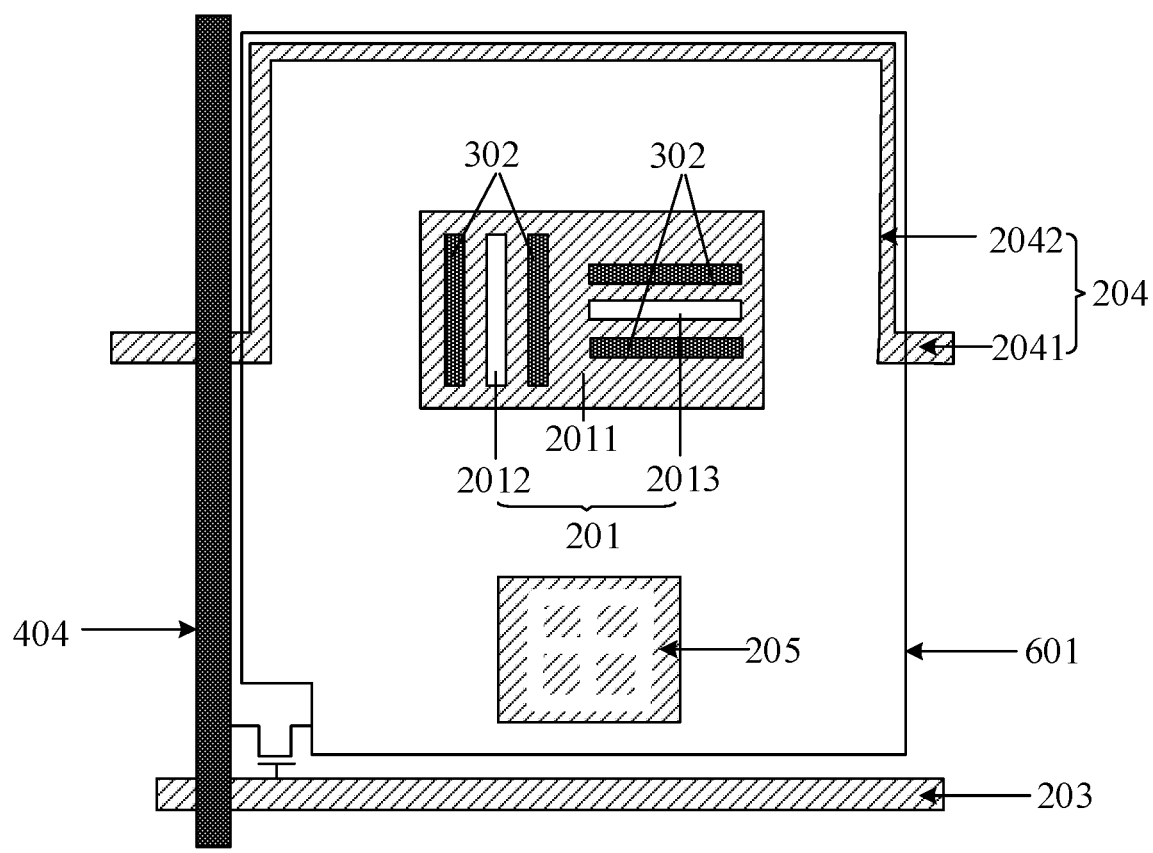
FIG. 10 is a top view of a first sub-pixel in an array substrate according to some embodiments of the present disclosure.
Figure 11:
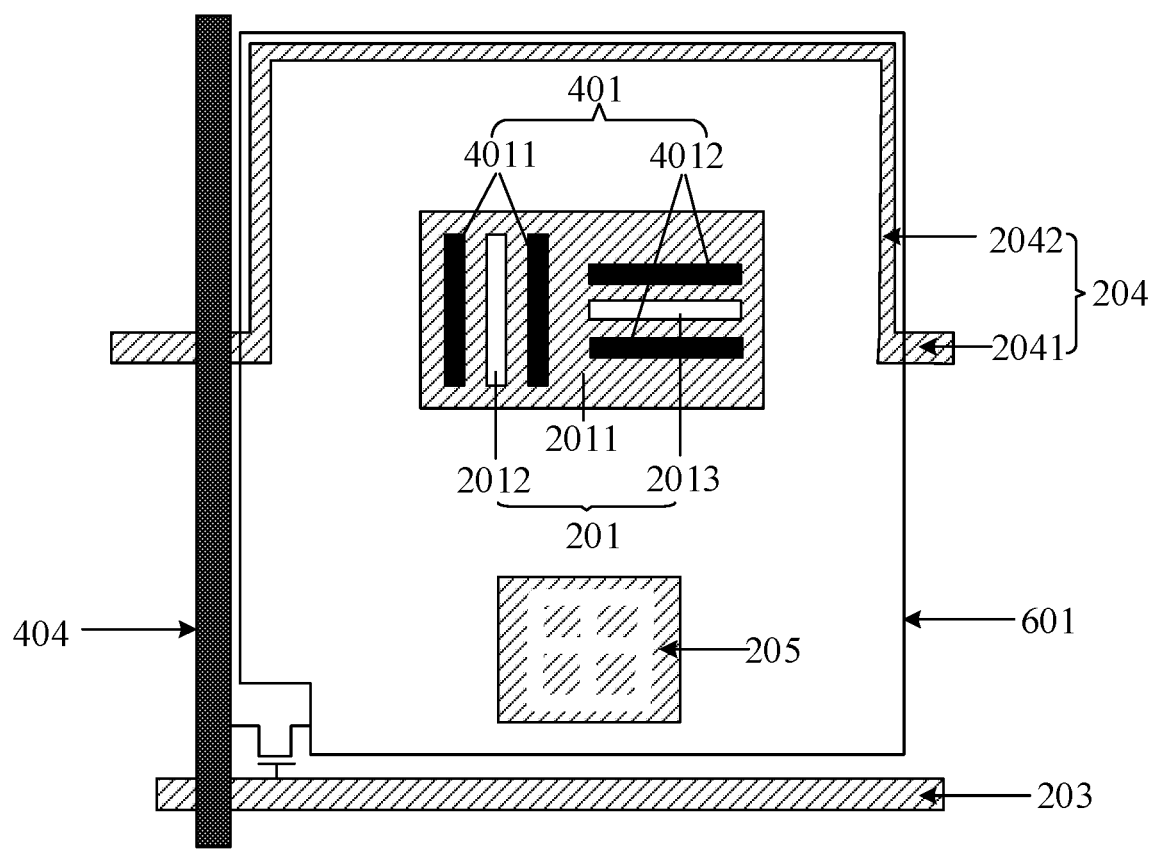
FIG. 11 is a top view of another first sub-pixel in an array substrate according to some embodiments of the present disclosure.
Figure 12:
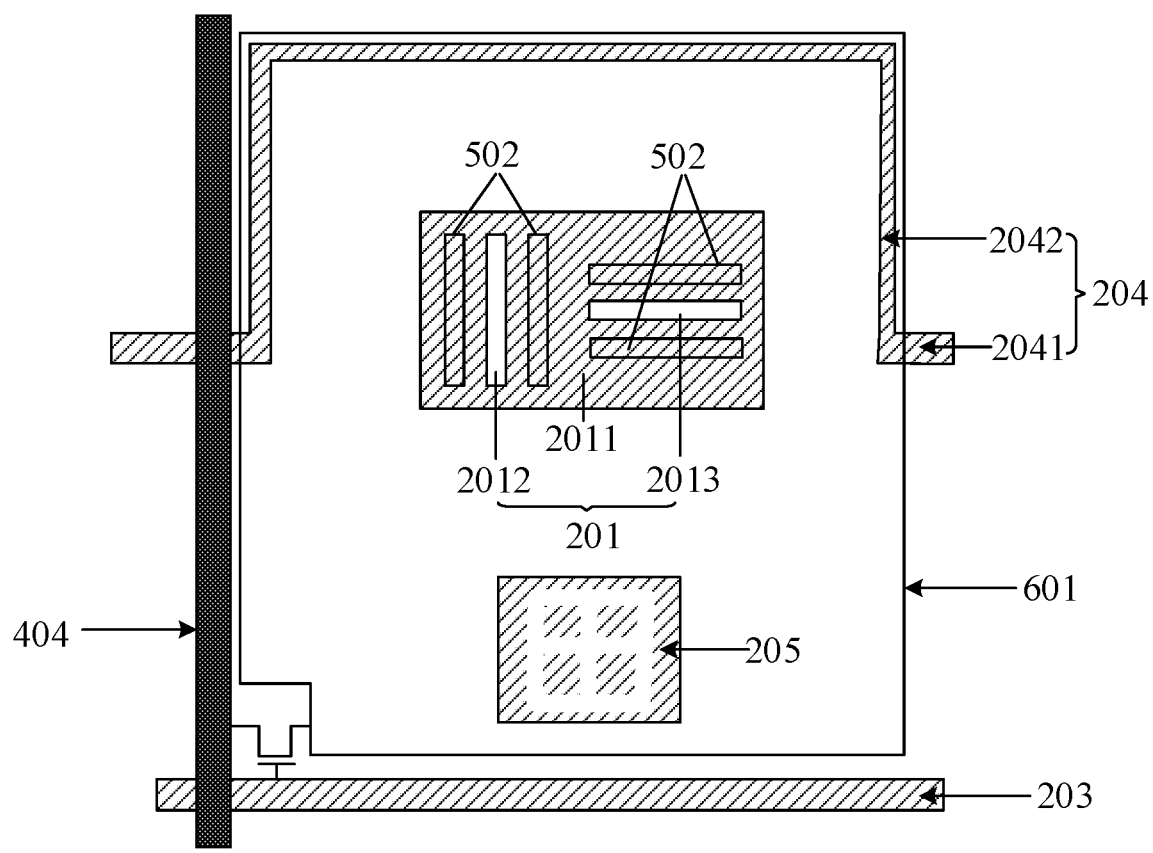
FIG. 12 is a top view of still another first sub-pixel in an array substrate according to some embodiments of the present disclosure.
Figure 13:
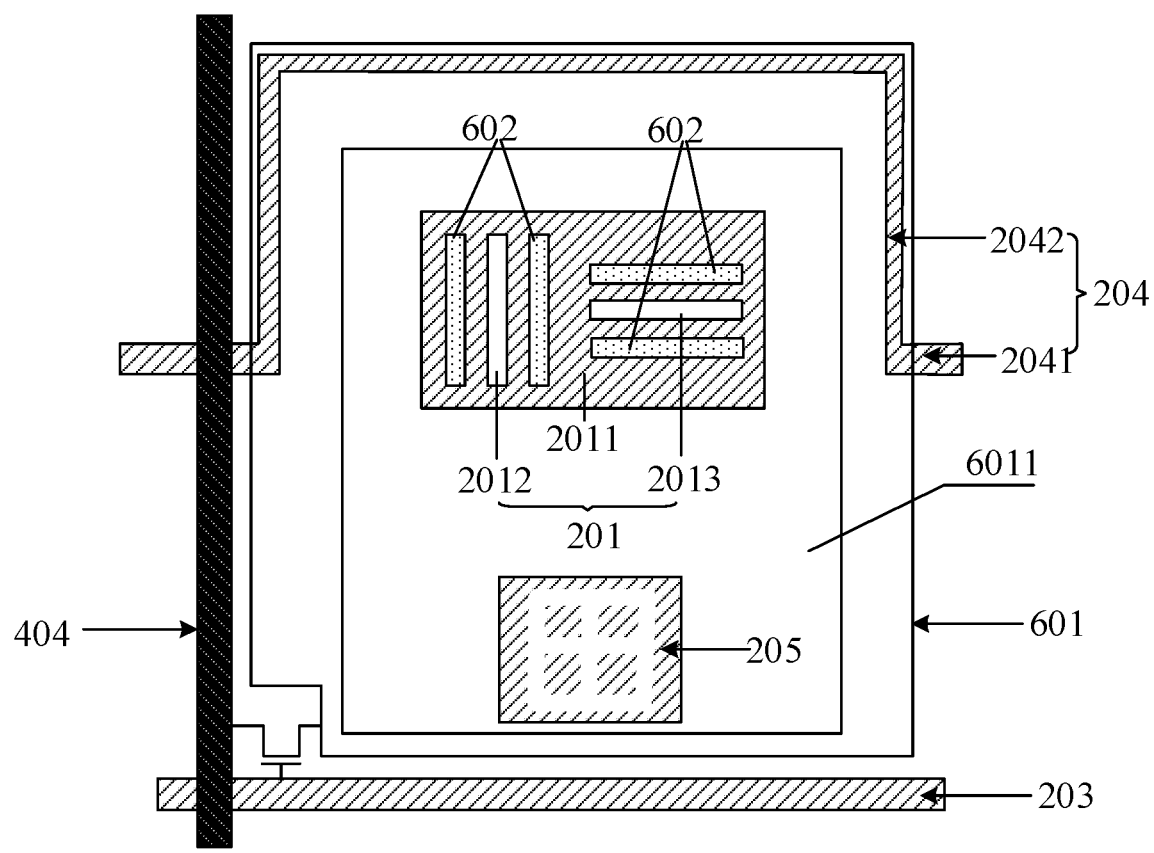
FIG. 13 is a top view of yet still another first sub-pixel in an array substrate according to some embodiments of the present disclosure.

FIG. 10 is a top view of a first sub-pixel in an array substrates according to some embodiments of the present disclosure, FIG. 11 is a top view of another first sub-pixel in an array substrate according to some embodiments of the present disclosure, FIG. 12 is a top view of still another first sub-pixel in an array substrate according to some embodiments of the present disclosure, and FIG. 13 is a top view of yet still another first sub-pixel in an array substrate according to some embodiments of the present disclosure. In some embodiments, as illustrated in FIG. 10, FIG. 11, FIG. 12, and FIG. 13, the first alignment structure 201 includes at least one first strip-shaped structure 2011 and at least one second strip-shaped structure 2012. A lengthwise direction of the first strip-shaped structure 2011 is intersected with a lengthwise direction of the second strip-shaped structure 2012. For example, the lengthwise direction of the first strip-shaped structure 2011 is perpendicular to the lengthwise of the second strip-shaped structure 2012.

Optionally, the first alignment structure 201 is an electrode block, and the first strip-shaped structure 2011 and the second strip-shaped structure 2012 are strip-shaped grooves within this electrode block. In this case, the orthographic projection of the second alignment structure corresponding to this first alignment structure 201 on the substrate 100 is within the orthographic projection of this first alignment structure 201 on the substrate 100. In other embodiments, the first alignment structure 2011 and the second alignment structure 2012 are both strip-shaped protrusions, such that the first alignment structure has at least two electrode strips, which is not limited herein.

It should be noted that FIG. 10 illustrates a positional relation between the first alignment structure 201 and the second alignment structure 302 which is in the active layer pattern 300, FIG. 11 illustrates a positional relation between the first alignment structure 201 and the second alignment structure 401 that is in the second conductive layer 400, FIG. 12 illustrates a positional relation between the first alignment structure 201 and the second alignment structure 502 that is in the planarization layer 500, and FIG. 13 illustrates a positional relation between the first alignment structure 201 and the second alignment structure 602 that is in the pixel electrode layer 600. The following embodiments give the description of the positional relation between the second alignment structure and the first alignment structure in detail using the positional relation between the second alignment structure 401 and the corresponding first alignment structure 201 in FIG. 11 as an example.

As illustrated in FIG. 11, the second alignment structure 401 corresponding to the first alignment structure 201 includes at least one third strip-shaped structure 4011 and at least one fourth strip-shaped structure 4012.

In the first alignment structure 201 and the second alignment structure 401 corresponding to this first alignment structure 201, a lengthwise direction of the third strip-shaped structure 4011 is parallel to the lengthwise direction of the first strip-shaped structure 2011, and a distance between an orthographic projection of this third strip-shaped structure 4011 on the substrate 100 and an orthographic projection of the first strip-shaped structure 2011 on the substrate 100 is within a first predetermined range; and a lengthwise direction of the fourth strip-shaped structure 4012 is parallel to the lengthwise direction of the second strip-shaped structure 2012, and a distance between an orthographic projection of this fourth strip-shaped structure 4012 on the substrate 100 and an orthographic projection of the second strip-shaped structure 2012 on the substrate 100 is within a second predetermined range. In this way, the positional relation between the orthographic projections of the first alignment structure 201 and the second alignment structure 401 on the substrate satisfies a predetermined relation, such that the second conductive layer 400 in which this second alignment structure 401 is disposed is not offset in any direction with respect to the first conductive layer 100.

Exemplarily, the number of first strip-shaped structures 2011 and the number of second strip-shaped structures 2012 in the first alignment structure 201 are both one; and the number of third strip-shaped structures 4011 and the number of fourth strip-shaped structures 4012 in the second alignment structure 401 are both two. In the first alignment structure 201 and the second alignment structure 401 corresponding to this first alignment structure 201, the first strip-shaped structure 2011 is between the two third strip-shaped structures 4011, and a difference between a distance between the orthographic projection of one of the two third strip-shaped structures 4011 on the substrate 100 and the orthographic projection of the first strip-shaped structure 2012 on the substrate 100 and a distance between the orthographic projection of the other of the two third strip-shaped structures 4011 on the substrate 100 and the orthographic projection of the first strip-shaped structure 2012 on the substrate 100 is less than a first predetermined threshold; and the second strip-shaped structure 2012 is between the two fourth strip-shaped structures 4012, and a difference between a distance between the orthographic projection of one of the two fourth strip-shaped structures 4012 on the substrate 100 and the orthographic projection of the second strip-shaped structure 4012 on the substrate 100 and a distance between the orthographic projection of the other of the two fourth strip-shaped structures 4012 on the substrate 100 and the orthographic projection of the second strip-shaped structure 4012 on the substrate 100 is less than a second predetermined threshold. In some embodiments, the first predetermined threshold is equal to the second predetermined threshold, and both the first predetermined threshold and the second predetermined threshold have values of 1.5 micrometers. That is, in the case that the difference in distances between the orthographic projections of the two third strip-shaped structures 4011 on the substrate 100 and the orthographic projection of the first strip-shaped structure 2012 on the substrate 100 is less than 1.5 microns, and the difference in distances between the orthographic projections of the two fourth strip-shaped structures 4012 on the substrate 100 and the orthographic projection of the second strip-shaped structure 4012 on the substrate 100 is also less than 1.5 microns, the positional relation between the orthographic projections of the first alignment structure 201 and the second alignment structure 401 on the substrate satisfies the predetermined relation.

It should be noted that for a positional relation between the second alignment structure and the first alignment structure within the film layer structure, other than the second conductive layer 400, of the plurality of patterned film layer structures, reference is made to the positional relation between the second alignment structure 401 and the first alignment structure 201 in the second conductive layer 400, which is not repeated herein.

In some embodiments, because the active layer pattern 300, the second conductive layer 400, and the pixel electrode layer 600 in the array substrate 000 are patterned structures, the third strip structures and the fourth strip structures in the active layer pattern 300, the second conductive layer 400, and the pixel electrode layer 400 are all strip-shaped protrusions. The planarization layer 500 in the array substrate 000 is an insulator layer, which needs to have a plurality of vias therein, and therefore, the third strip-shaped structure and the fourth strip-shaped structure in the planarization layer 500 are all strip-shaped grooves.

Optionally, the plurality of alignment regions 001c within each of the normal display regions 001a are uniformly arranged at edge positions of this normal display region 001a. In each of the patterned film layer structures 100a in the array substrate 000, in the case that one of the patterned film layer structures is offset with respect to the first conductive layer 200, the occurrence of the film layer offset is more obvious at the edge positions. Therefore, the alignment region 001c is arranged at the edge position within the normal display region 001a. In this way, after the positional relation between the orthographic projections of each of the first alignment structures 201 and the corresponding second alignment structure within the alignment region 001c on the substrate 100 satisfies the predetermined positional relation, it is ensured that no offset occurs between the patterned film layer structure where this second alignment structure is disposed and the first electrically conductive layer 200 at various positions.

In the present disclosure, the first conductive layer 200 includes, in addition to the first alignment structure 201, a gate electrode 202 of a thin film transistor in the sub-pixel and a gate line 203 electrically connected to the gate electrode 202.

The active layer pattern 300 includes, in addition to the second alignment structure, an active layer 301 of the thin film transistor in the sub-pixel. An orthographic projection of the active layer 301 of the thin film transistor on the substrate 100 is coincident with an orthographic projection of the gate electrode 202 of the thin film transistor on the substrate 100, and the active layer 301 is insulated from the gate electrode 202 by the gate insulator layer 700.

The second conductive layer 400 includes, in addition to the second alignment structure 401, a first electrode 402 and a second electrode 403 of the thin film transistor in the sub-pixel, and a data line 404 electrically connected to the first electrode 402.

The planarization layer 500 has, in addition to the second alignment structure, a connection via 501.

The pixel electrode layer 600 includes, in addition to the second alignment structure 401, a pixel electrode 601 in the sub-pixel. The pixel electrode 601 is electrically connected to the second electrode 403 of the thin film transistor via the connection via 501.

In the present disclosure, a plurality of gate lines 203 and a plurality of data lines 404 are provided in the array substrate 300. The plurality of gate lines 203 are arranged in parallel, and the plurality of data lines 404 are arranged in parallel. A lengthwise direction of the gate line 203 is perpendicular to a lengthwise direction of the data line 404. In this way, any adjacent two gate lines 203 and any adjacent two data lines 404 enclose a sub-pixel region, and one of the sub-pixels is arranged in one of the sub-pixel regions.

Optionally, as illustrated in FIG. 13, the pixel electrode 601 in the sub-pixel is typically in the shape of a block, and a vertical distance between the pixel electrode 601 and the gate line 203 and a vertical distance between the pixel electrode 601 and the data line 404 are small. Therefore, to normally arrange the second alignment structure 602 of the pixel electrode layer 600 within the sub-pixel region, a hollowed-out structure 6011 is defined in the pixel electrode 601 of the first sub-pixel, wherein the orthographic projection of the pixel electrode 601 on the substrate 100 is overlapped with the orthographic projection of the second alignment structure 602 of the pixel electrode layer 600 on the substrate 600, and the orthographic projections of the second alignment structure 602 in the pixel electrode layer 600 and the corresponding first alignment structure 201 on the substrate 100 are both ensured to be within an orthographic projection of the hollowed-out structure 6011 on the substrate 100. In this way, the pixel electrodes 601 arranged in the sub-pixel region do not affect the positional distribution of the second alignment structures 602, such that during the process of preparing the pixel electrode layer 600, due to the positional relation between the first alignment structure 201 and the photoresist alignment structure corresponding to the second alignment structure 602, the pixel electrode layer 600 is not offset with respect to the first conductive layer 200. In other embodiments, the pixel electrode is not defined in the pixel electrode 601 within the first sub-pixel, wherein the orthographic projection of the pixel electrode 601 on the substrate 100 is overlapped with the orthographic projection of the second alignment structure 602 of the pixel electrode layer 600 on the substrate 100.

In some embodiments, the first conductive layer 200 further includes an auxiliary signal line 204. An orthographic projection of the auxiliary signal line 204 on the substrate 100 is at least partially overlapped with the orthographic projection of the pixel electrode 601 in the at least a portion of the sub-pixels on the substrate 100. The overlapped portion between the auxiliary signal line 204 and the pixel electrode 601 forms a storage capacitor Cst. A pixel voltage applied to the pixel electrode 601 is maintained by the storage capacitor Cst, such that the pixel voltage used to maintain the pixel electrode 601 does not change. In the present disclosure, the first alignment structure 201 is also arranged in the sub-pixel region where the pixel electrode 601 is disposed. Therefore, to ensure that the first alignment structure 201 does not affect the auxiliary signal line 204, it is necessary to ensure that the orthographic projection of the auxiliary signal line 204 on the substrate 100 is not overlapped with the orthographic projection of the first alignment structure 201 on the substrate 100. It should be noted that the pixel electrode is not defined in the first sub-pixel whose orthographic projection on the substrate 100 is overlapped with the orthographic projection of the second alignment structure 602 of the pixel electrode layer 600 on the substrate or the hollowed-out structure 6011 is defined in the pixel electrode 601 within this first sub-pixel. Therefore, the orthographic projection of the auxiliary signal line 204 on the substrate 100 is not overlapped with the orthographic projection of the first sub-pixel on the substrate 100, but the orthographic projection of the auxiliary signal line 204 on the substrate 100 needs to be overlapped with the orthographic projections of the pixel electrodes 601 of other sub-pixels on the substrate 100.

Exemplarily, the auxiliary signal line 204 includes an auxiliary signal line body 2041 and a bending coil 2042 electrically connected to the auxiliary signal line body 2041. At least a portion of the first alignment structure 201 is within a region enclosed by the bending coil 2042. In this way, it is ensured that the orthographic projection of the first alignment structure 201 on the substrate 101 is not overlapped with the orthographic projection of the auxiliary signal line 204 on the substrate 101. A lengthwise direction of the auxiliary signal line body 2041 is parallel to the lengthwise direction of the gate line 203. The bending coil 2042 is composed of two first portions extending along the lengthwise direction of the data line 404 and a second portion between these two first portions, and a lengthwise direction of the second portion of the bending coil 2042 is parallel to the lengthwise direction of the gate line 203. It should be noted that the region enclosed by the bending coil 2042 in the embodiments of the present disclosure is not a closed region, but an open region.

In some embodiments, as illustrated in FIG. 10, FIG. 11, FIG. 12, or FIG. 13, the first conductive layer 200 further includes a plurality of auxiliary alignment structures 205 within the alignment region 001c. The plurality of auxiliary alignment structures 205 are in one-to-one correspondence to the plurality of first alignment structures 201, and orthographic projections of each of the auxiliary alignment structures 205 and the corresponding first alignment structure 201 on the substrate 100 are within the orthographic projection of the same first sub-pixel 100al on the substrate 100. The auxiliary alignment structure 205 herein includes an electrode block, an annular groove within the electrode block, and a cross-shaped groove within the annular groove.

Exemplarily, in the process of forming one of the patterned film layer structures, other than the first conductive layer 200, of the array substrate 000, after a photoresist alignment structure corresponding to the second alignment structure of this patterned film layer structure is formed, it is necessary to determine whether a positional relation between this photoresist alignment structure and the corresponding first alignment structure 201 satisfies a predetermined positional relation. In the process of determining whether the positional relation satisfies the predetermined positional relation, it is necessary to acquire a picture including this photoresist alignment structure and the corresponding first alignment structure 100al and to determine whether the positional relation between the two satisfies the predetermined positional relation. The pattern structure within the array substrate 000 is complex, widths of the first strip-shaped structure 2011 and the second strip-shaped structure 2012 in the first alignment structure 201 are small, and widths of the third strip-shaped structure and the fourth strip-shaped structure in the second alignment structure are small. Therefore, the photoresist alignment structure and the first alignment structure in the picture are not easily recognized. To improve the efficiency of recognizing the photoresist alignment structure and the first alignment structure in the picture, the auxiliary alignment structure 205 is defined within the first conductive layer 200, and the auxiliary alignment structure 205 in the picture is more easily recognized compared to the first alignment structure. In this way, the auxiliary alignment structure 205 in the picture is recognized first, and then the photoresist alignment structure and the first alignment structure around the auxiliary alignment structure 205 are recognized, such that the efficiency of recognizing the photoresist alignment structure and the first alignment structure in the picture is effectively improved.

In summary, the array substrate according to some embodiments of the present disclosure includes the substrate and the plurality of patterned film layer structures stacked on the substrate. The portion, within the first splicing display region, of the patterned film layer structure is formed based on the first mask and the second mask of the mask plate, the portion, within the normal display region, of the patterned film layer structure is formed based on the first mask of this mask plate, and the portion, within the non-display region, of the patterned film layer structure is formed based on the second mask of this mask plate. Therefore, in the process of forming the patterned film layer structure in the array substrate, there is no need to separately expose the photoresist within the first splicing display region by using an additional mask plate, such that the number of exposures is effectively reduced, and thus the manufacturing process for a large-sized display panel subsequently prepared based on this array substrate is simplified. Moreover, in the process of forming the film mask and the second mask of the mask plate are simultaneously used in the two exposures, and after the two exposures and the development of the photoresist film, only the photoresist within the first exposure region formed based on the first mask is retained. Accordingly, in the patterned film layer structure in the array substrate formed based on the same mask plate, the unit area of the portion, within the first splicing display region. of the pattern is approximately equal to the unit area of the portion, within the normal display region, of the pattern. In this way, the uniformity of the patterned film layer structures within the array substrate in the embodiments of the present disclosure is good, and thus the display effect of the display panel subsequently formed based on this array substrate is good.

Some embodiments of the present disclosure further provide a method for manufacturing an array substrate, which is configured to manufacture the array substrate as described above. The array substrate has a display region and a non-display region disposed on a periphery of the display region. The method includes: successively forming a plurality of stacked patterned film layer structures on a substrate.

The plurality of patterned film layer structures are configured to form a plurality of sub-pixels. The plurality of sub-pixels include a plurality of first sub-pixels within the display region and a plurality of virtual sub-pixels within the non-display region. An area of an orthographic projection of a pixel electrode of the virtual sub-pixel on the substrate is greater than an area of an orthographic projection of a pixel electrode of the first sub-pixel on the substrate.

In some embodiments, the display region includes a plurality of normal display regions arranged in arrays and a first splicing display region between adjacent two normal display regions. Forming each of the patterned film layer structures includes:

forming a whole-layered film layer structure on the substrate; forming a photoresist film on the film layer structure, and successively performing an exposure operation on portions, within the plurality of normal display regions, of the photoresist film using a mask plate; and developing the exposed photoresist film, and etching the whole-layered film layer structure. In this way, the patterned film layer structure is formed on the substrate.

Performing the exposure operation on a portion, within one of the normal display regions, of the photoresist film includes: forming a first exposure region within a first normal display region and a target splicing display region using a first mask of a mask plate and forming a second exposure region within the non-display region and the target splicing display region using a second mask of the mask plate; and moving the mask plate along a direction toward the second normal display region until the first mask covers the second normal display region and the second exposure region that is within the target splicing display region and the second mask covers the first exposure region within the target splicing display region. The first normal display region is any one of a plurality of normal display regions, the second normal display region is a normal display region adjacent to the first normal display region, and the target splicing display region is a first splicing display region between the first normal display region and the second normal display region.

Optionally, a unit area of the first exposure region is less than a unit area of the second exposure region.

It should be clearly understood by those skilled in the art that for the convenience and brevity of the description, the specific processes and principles of the method for manufacturing the array substrate described above refer to the corresponding contents in the embodiments of the structure of the array substrate described above, which is not repeated herein.

In summary, the method for manufacturing the array substrate according to some embodiments of the present disclosure includes forming the plurality of stacked patterned film layer structures on the substrate. A portion, within the first splicing display region, of the patterned film layer structure is formed based on the first mask and the second mask of the mask plate, a portion, within the normal display region, of the patterned film layer structure is formed based on the first mask of this mask plate, and a portion, within the non-display region, of the patterned film layer structure is formed based on the second mask of this mask plate. Therefore, in the process of forming the patterned film layer structure in the array substrate, there is no need to separately expose the photoresist within the first splicing display region by using an additional mask plate, such that the number of exposures is effectively reduced, and thus the manufacturing process for a large-sized display panel subsequently prepared based on this array substrate is simplified. Moreover, in the process of forming the film layer structure within the first splicing display region, two exposures are required. Both the first mask and the second mask of the mask plate are simultaneously used in the two exposures, and after the two exposures and the development of the photoresist film, only the photoresist within the first exposure region formed based on the first mask is retained. Accordingly, in the patterned film layer structure in the array substrate formed based on the same mask plate, a unit area of a portion, within the first splicing display region, of the pattern is approximately equal to a unit area of a portion, within the normal display region, of the pattern. In this way, the uniformity of the patterned film layer structures within the array substrate in the embodiment of the present disclosure is good, such that a display effect of a display panel subsequently formed based on this array substrate is good.

Some embodiments of the present disclosure further provide a liquid crystal panel, which is integrated into any large-sized display device with a display function, such as a television or a screen. The array substrate includes an array substrate and a color film substrate arranged opposite to each other, and a liquid crystal layer between the array substrate and the color film substrate. This array substrate is the array substrate illustrated in the above embodiments.

It should be noted that in the accompanying drawings, the sizes of layers and regions may be exaggerated for clearer illustration. It should be understood that where an element or layer is referred to as being "on" another element or layer, the element or layer may be directly on another element, or intervening layers therebetween may be present. In addition, it should be understood that where an element or layer is referred to as being "under" another element or layer, the element or layer may be directly under the other element, or there may be more than one intervening layer or element. In addition, it may be further understood that in the case that a layer or element is referred to as being "between" two layers or two elements, the layer may be the only layer between the two layers or two elements, or more than one intervening layer or element may further be present. Like reference numerals indicate like elements throughout.

In the present disclosure, the terms "first" and "second" are only used for descriptive purposes, and cannot be understood as indicating or implying relative importance. The term "a plurality of" refers to two or more, unless expressly defined otherwise.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A method for manufacturing an array substrate, the array substrate having a display region and a non-display region disposed on a periphery of the display region, the method comprising:
successively forming a plurality of stacked patterned film layer structures on a substrate;
wherein the plurality of patterned film layer structures are configured to form a plurality of sub-pixels, the plurality of sub-pixels comprising a plurality of first sub-pixels within the display region and a plurality of virtual sub-pixels within the non-display region;

wherein area of an orthographic projection of a pixel electrode of the virtual sub-pixel on the substrate is greater than an area of an orthographic projection of a pixel electrode of the first sub-pixel on the substrate, the display region comprises a plurality of normal display regions arranged in arrays and a first splicing display region between adjacent two of the normal display regions;

wherein forming each of the patterned film layer structures comprises:

forming a whole-layered film layer structure on the substrate;

forming a photoresist film on the film layer structure and successively performing an exposure operation on portions, within the plurality of normal display regions, of the photoresist film by using a mask plate; and forming the patterned film layer structure on the substrate by developing the exposed photoresist film and etching the whole-layered film layer structure;

wherein performing the exposure operation on the portion, within one of the plurality of normal display regions, of the photoresist film comprises:

forming a first exposure region within a first normal display region and a target splicing display region by using a first mask of the mask plate, and forming a second exposure region within the non-display region and the target splicing display region by using a second mask of the mask plate; and moving the mask plate along a direction toward the second normal display region until the first mask covers the second normal display region and the second exposure region that is within the target splicing display region and the second mask covers the first exposure region within the target splicing display region;

wherein the first normal display region is any one of the plurality of normal display regions, the second normal display region is a normal display region adjacent to the first normal display region, and the target splicing display region is a first splicing display region between the first normal display region and the second normal display region.

2. The method according to claim 1, wherein a unit area of the first exposure region is less than a unit area of the second exposure region.

3. A liquid crystal panel, comprising: an array substrate and a color film substrate that are arranged opposite to each other, and a liquid crystal layer between the array substrate and the color film substrate, wherein the array substrate is manufactured by the method according to claim 1.

4. The method according to claim 1, wherein the plurality of sub-pixels further comprise a plurality of second sub-pixels within the first splicing display region;

wherein an area of an orthographic projection of a pixel electrode of the second sub-pixel on the substrate is less than or equal to the area of the orthographic projection of the pixel electrode of the first sub-pixel on the substrate.

5. The method according to claim 4, wherein the plurality of sub-pixels further comprise a plurality of third sub-pixels, wherein a portion of each of the third sub-pixels is within the normal display region and another portion of each of the third sub-pixels is within the first splicing display region;

wherein in a lengthwise direction parallel to the first splicing display region, a width of the portion, within the first splicing display region, of the third sub-pixel is less than or equal to a width of the portion, within the normal display region, of the third sub-pixel.

6. The method according to claim 4, wherein the display region further comprises a second splicing display region between two first splicing display regions arranged along a row direction and two first splicing display regions arranged along a column direction, and the plurality of sub-pixels further comprise a fourth sub-pixel within the second splicing display region;

wherein an area of an orthographic projection of a pixel electrode of the fourth sub-pixel on the substrate is less than or equal to the area of the orthographic projection of the pixel electrode of the second sub-pixel on the substrate.

7. The method according to claim 1, wherein the normal display region comprises a plurality of alignment regions; wherein a film layer structure, closest to the substrate, of the plurality of patterned film layer structures is a first conductive layer, the first conductive layer comprising a plurality of first alignment structures within the alignment region;

each of film layer structures, other than the first conductive layer, of the plurality of patterned film layer structures comprises one of a plurality of second alignment structures within the alignment region, orthographic projections of the second alignment structures of the film layer structures on the substrate being not overlapped with each other; and the plurality of first alignment structures and the plurality of second alignment structures within the same alignment region are in one-to-one correspondence, and a positional relation between an orthographic projection of the first alignment structure on the substrate and an orthographic projection of the corresponding second alignment structure on the substrate satisfies a predetermined positional relation.

8. The method according to claim 7, wherein the orthographic projections of the first alignment structures on the substrate are respectively within the orthographic projections of different first sub-pixels on the substrate, and the orthographic projection of the first alignment structure and the orthographic projection of the corresponding second alignment structure on the substrate are within the orthographic projection of a same first sub-pixel on the substrate.

9. The method according to claim 8, wherein the first alignment structure comprises at least one first strip-shaped structure and at least one second strip-shaped structure, a lengthwise direction of the first strip-shaped structure being intersected with a lengthwise direction of the second strip-shaped structure; and the second alignment structure corresponding to the first alignment structure comprises at least one third strip-shaped structure and at least one fourth strip-shaped structure; wherein a lengthwise direction of the third strip-shaped structure is parallel to the lengthwise direction of the first strip-shaped structure, and a distance between an orthographic projection of the third strip-shaped structure on the substrate and an orthographic projection of the first strip-shaped structure on the substrate is within a first predetermined range; and a lengthwise direction of the fourth strip-shaped structure is parallel to the lengthwise direction of the second strip-shaped structure, and a distance between an orthographic projection of the fourth strip-shaped structure on the substrate and an orthographic projection of the second strip-shaped structure on the substrate is within a second predetermined range.

10. The method according to claim 9, wherein the number of the first strip-shaped structures and the number of the second strip-shaped structures are both one, and the number of the third strip-shaped structures and the number of the fourth strip-shaped structures in the second alignment structure are both two; wherein
the first strip-shaped structure is between the two third strip-shaped structures, and a difference in distances between the orthographic projections of the two third strip-shaped structures on the substrate and the orthographic projection of the first strip-shaped structure on the substrate is less than a first predetermined threshold; and
the second strip-shaped structure is between the two fourth strip-shaped structures, and a difference in distances between the orthographic projections of the two fourth strip-shaped structures on the substrate and the orthographic projection of the second strip-shaped structure on the substrate is less than a second predetermined threshold.

11. The method according to claim 10, wherein the first alignment structure is an electrode block, the first strip structure and the second strip structure are both strip-shaped grooves within the electrode block, and the orthographic projection of the second alignment structure on the substrate is within the orthographic projection of the corresponding first alignment structure on the substrate.

12. The method according to claim 11, wherein the patterned film layer structures, other than the first conductive layer, of the plurality of patterned film layer structures comprise an active layer pattern, a second conductive layer, a planarization layer, and a pixel electrode layer, wherein the active layer pattern, the second conductive layer, the planarization layer, and the pixel electrode layer are successively stacked along a direction perpendicular to and away from the substrate; and
the array substrate further comprises a whole-layered gate insulator layer between the active layer pattern and the first conductive layer;
wherein the third strip-shaped structures and the fourth strip-shaped structures in the active layer pattern, the second conductive layer, and the pixel electrode layer are strip-shaped protrusions, and the third strip-shaped structure and the fourth strip-shaped structure in the planarization layer are strip-shaped grooves.

13. The method according to claim 12, wherein
the first conductive layer further comprises a gate electrode of a thin film transistor in the sub-pixel and a gate line electrically connected to the gate electrode;
the active layer pattern further comprises an active layer of the thin film transistor in the sub-pixel;
the second conductive layer further comprises a first electrode and a second electrode of the thin film transistor in the sub-pixel and a data line electrically connected to the first electrode;
the planarization layer further comprises a connection via; and
the pixel electrode layer further comprises a pixel electrode in the sub-pixel, the pixel electrode being electrically connected to the second electrode through the connection via.

14. The method according to claim 13, wherein
the pixel electrode is not provided within the first sub-pixel whose orthographic projection on the substrate is overlapped with the orthographic projection of the second alignment structure in the pixel electrode layer on the substrate; or
the pixel electrode within the first sub-pixel whose orthographic projection on the substrate is overlapped with the orthographic projection of the second alignment structure in the pixel electrode layer on the substrate has a hollowed-out structure therein, and the orthographic projection of the second alignment structure in the pixel electrode layer on the substrate and the orthographic projection of the corresponding first alignment structure on the substrate are both within an orthographic projection of the hollowed-out structure on the substrate.

15. The method according to claim 8, wherein the first conductive layer further comprises an auxiliary signal line, wherein an orthographic projection of the auxiliary signal line on the substrate is at least partially overlapped with the orthographic projection of the pixel electrode in at least a portion of the sub-pixels on the substrate and is not overlapped with the orthographic projection of the first alignment structure on the substrate.

16. The method according to claim 15, wherein the auxiliary signal line comprises an auxiliary signal line body and a bending coil electrically connected to the auxiliary signal line body, at least a portion of the first alignment structure being within a region enclosed by the bending coil.

17. The method according to claim 16, wherein the first conductive layer further comprises a plurality of auxiliary alignment structures within the alignment region, wherein the plurality of auxiliary alignment structures are in one-to-one correspondence to the plurality of first alignment structures, and an orthographic projection of the auxiliary alignment structure and the orthographic projection of the corresponding first alignment structure are both within the orthographic projection of a same first sub-pixel on the substrate.

18. The method according to claim 8, wherein the plurality of alignment regions in the normal display region are uniformly distributed at edge positions of the normal display region.

* * * * *